April 29, 1941.　　　G. JOBST　　　2,239,677
METHOD OF ELECTRON CONTROL
Filed May 23, 1938　　　2 Sheets-Sheet 1
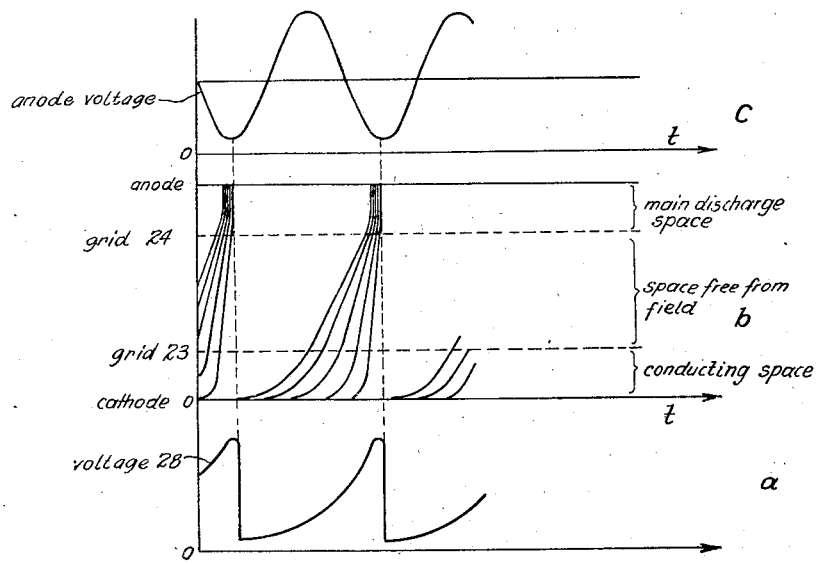
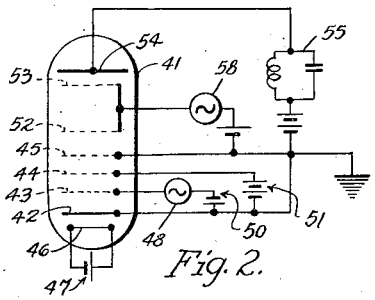
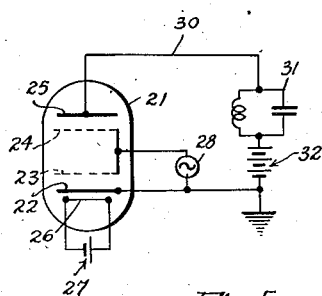
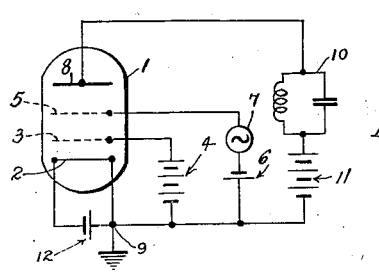
Inventor:
G. Jobst
By Glascock Downing & Seebold
Attys.

April 29, 1941.                G. JOBST                2,239,677
                      METHOD OF ELECTRON CONTROL
                        Filed May 23, 1938              2 Sheets-Sheet 2
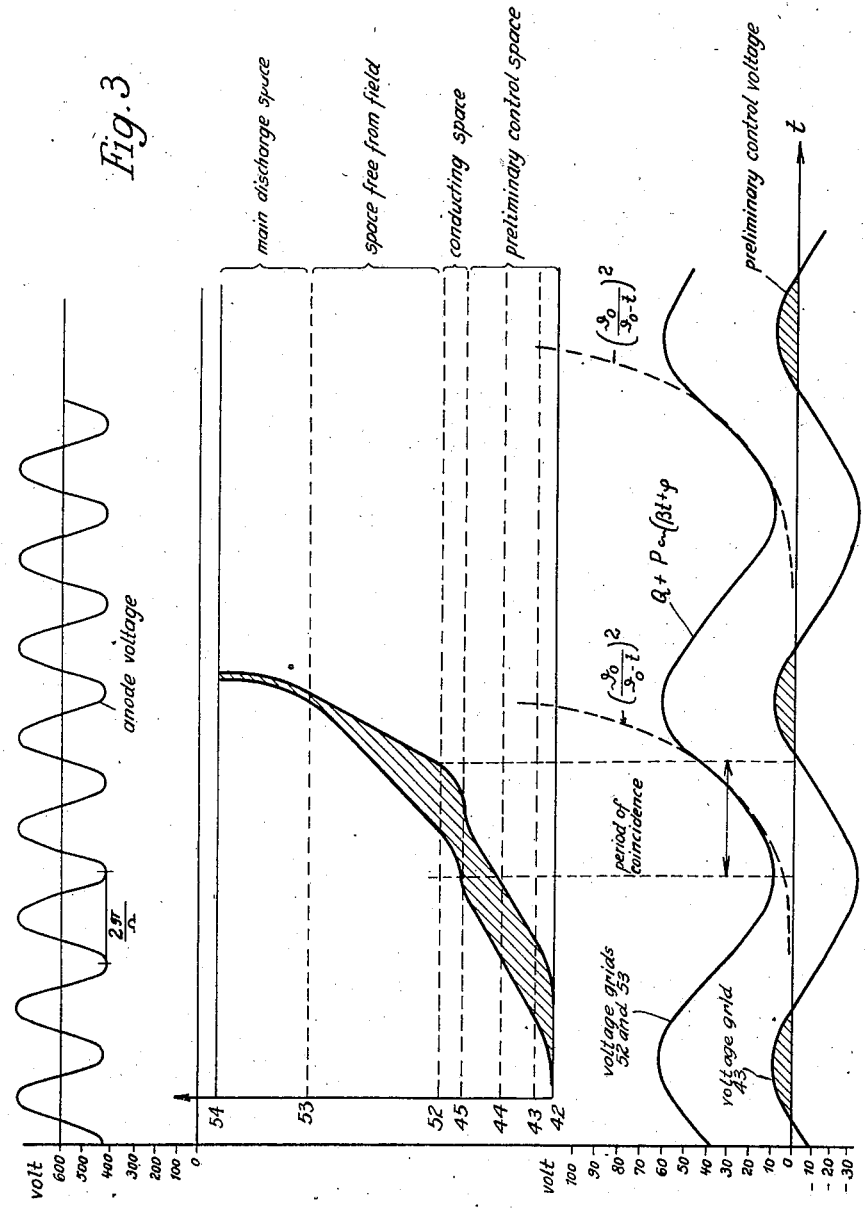

Patented Apr. 29, 1941

2,239,677

UNITED STATES PATENT OFFICE 2,239,677

METHOD OF ELECTRON CONTROL

Günther Jobst, Berlin, Germany

Application May 23, 1938, Serial No. 209,595
In Germany May 26, 1937

9 Claims. (Cl. 250—36)

The present invention relates to electron discharge devices and a method of controlling the movement of electrons in such apparatus.

In the generation of oscillations by means of the periodic transference of charges within thermionic valves, the time of absorption of a charge into the anode (referred to below chiefly as absorption period) is of considerable importance. In the case of long waves in which the times of travel of the charge are negligibly small compared with the periodic time, this absorption period determines the efficiency. In the case of very high frequencies the time of travel to a large extent determines the amplitude of the oscillation which is generated; the highest attainable frequency is to a first approximation determined by the absorption period. The smaller this is, the greater is the possible frequency.

As long as it is assumed that the time taken for the charge to leave the cathode is approximately as long as the time of absorption of the same amount of charge at the anode, it necessarily follows that only relatively small amounts of charge can be transferred and there is a very poor utilisation of the cathode since with very rapid oscillations, that is, very brief control impulses, the amounts of charge which pass over are greatly reduced on account of the inertia of the electrons.

The present invention is based on the combination of a small anode absorption period with a relatively large emission period of the quantities of electrons which leave the cathode and form the impulse. In this manner the quantities of charge are increased without reducing the efficiency, the cathode is better utilised and the generation of oscillations of highest frequency is made possible.

The emission period of a quantity of electrons forming an impulse represents an emission interval which may form a large part of the repetition period. The electrons which successively leave the cathode during this interval are to be collected together as free electrons or are to be conveyed from the cathode to the anode by different paths or with different velocities in such a manner that they all reach the anode approximately at the same time and are in a very short time absorbed by or allowed to pass through the anode. Thus groups of electrons which are forced together with respect to time are formed, the phase of absorption of which into the anode may be favourable with respect to efficiency and output.

When the term "anode" is used in the following it is to be understood as meaning that electrode connected to the oscillatory circuit which has the highest positive continuous voltage. It may be constructed as a continuous or as a perforated grid-like electrode. In this case the term "absorption period" is to be understood as meaning the time of passage of the impulse charge through the electrode surface. The term "cathode" means principally the incandescent cathode, but in some cases an electrode or space from which, or through which, electrons enter a space with small velocity (for example secondary active electrode, virtual cathode). When it is necessary for clearness, the cathode which emits the electrons by thermionic emission is expressly described as emission cathode.

Various modes of carrying the invention into effect will now be described with reference to the accompanying diagrammatic drawings.

In the drawings:

Fig. 1 is a diagram illustrating the wave form of the voltage applied to the grids, the movement of the electrons in the tube and the frequency of the anode voltage.

Fig. 2 is a diagrammatic view of one arrangement for carrying out the invention.

Fig. 3 is a diagram of the relationship of the voltages and electron movement in the tube shown in Fig. 2.

Fig. 4 is a diagrammatic view of a modification.

Fig. 5 is a diagrammatic view of another tube and circuit arrangement.

In an electron tube 1 of Fig. 4 the cathode 2 capable of being saturated may be formed of tungsten wire. The cathode is surrounded by a small meshed grid 3. The cathode 2 is heated by a voltage source 12 which is grounded at the point 9. The grid 3 receives from the voltage source 4 a high voltage, which considerably exceeds the saturation voltage. Another grid 5 is arranged behind the grid 3. The grid 5 receives negative preliminary voltage from the voltage source 6 and an alternating voltage from the source 7. The voltages are in such a ratio to each other that the potential at the grid 5 is positive for a short period during each impulse repetition period which is equal to the period of the alternating voltage source 7. Behind the grid 5 the positive anode 8 is arranged which is grounded at 9 through the oscillatory circuit 10 and the high positive voltage source 11.

On account of the high positive voltage at the grid 3 the first electrons will leave the cathode 2 continuously and will oscillate in the collecting space between the cathode 2 and the grid 5 until this space has received a filling of electrons corresponding to the voltage of the grid 3. Then the collecting space is for a brief period opened by a positive voltage impulse at the grid 5, the opening period being preferably about equal to twice the time of travel of the electrons in the space between the cathode 2 and the grid 5. The absorption period of the anode 8 for an electron group collected within an impulse period or the period of the alternating voltage 7 corresponds approximately to this opening period while the emission period of the cathode is practically equal to the time between two impulses since the high voltage at the grid 3 causes no interruption of the flow of electrodes from the cathode 2 owing to space charge. Thus the charge transferred is a multiple of that which would reach the anode when the cathode discharge is directly influenced by a grid which is opened for a short period or a multiple of that charge which might be accumulated if the grid 3 possessed a voltage which did not substantially exceed the saturation voltage even if a considerable part of the oscillating electrons are absorbed by a small meshed grid 3. The example shown and described in connection with Fig. 4 is intended only to illustrate a form for carrying out the invention.

A different embodiment for carrying out the invention is shown in Fig. 5, wherein an electron tube 21 contains a cathode 22, a grid 23, a second grid 24 and an anode 25 which are arranged parallel to each other. The cathode 22 is for example an indirect heated type which receives the necessary temperature through the heating filament 26 rendered incandescent by the battery 27. The two grids 23 and 24 may be connected together within the tube and receive voltage from a source 28, the course of which with respect to time should be approximately that shown in Figure 1 by the curve $a$. The voltage source 28 should have a periodic function with a steeply rising and a sharply drooping characteristic. It is possible by means of the course of voltage that the electrons which later leave the cathode 22 within an impulse repeating period are much more accelerated by the substantially increased voltage than the electrons which left earlier so that with their higher velocity they reach the same voltage in the space in which there is no field between the grids 23 and 24 in a corresponding relation between the distances of the electrodes and the course of the voltage. The theoretically favorable course of the rising branch should be proportional to the function $$\left(\frac{\delta_0}{\delta_0-t}\right)^2$$

if $t$ is the time and $\delta_0$ is the instant of uniting of the electrons. As long as the voltage at the first grid 23 is comparatively small, the electrons leaving the cathode 22 will be only slightly accelerated into the space between the cathode 22 and the first grid 23, the "conducting space." The electrons then pass through the adjoining space, which lies between the grids 23 and 24 and in which there is no field, with a constant small velocity. But the later the electrons leave the cathode 22 the stronger is the field and acceleration at the cathode 22 and the greater is the constant velocity in the space between the grids 23 and 24. The dimensions of the spaces between the cathode 22 and the grid 23 and between the grid 23 and the grid 24 may be so chosen in relation of the course of the voltage with respect to time that all the electrons reach the second grid 24 at the same time $\delta_0$ and if the time of travel from the second grid 24 to the anode 25 is sufficiently small also reach the anode 25 together. There is then produced in the line 30 a sharply limited impulse which influences the oscillatory circuit 31 arranged between the anode 25 and the grounded voltage source 32. The frequency of said oscillatory circuit is equal to or a multiple of the impulse repetition frequency. In Figure 1 a time-distance diagram for the individual electron paths is shown by the curves $b$ from which it is clear how the discharge passes through the grid 24 to the anode 25 while forced together and heaped up with respect to time. At $c$ in Figure 1 the anode voltage is arranged to indicate the time. The frequency of the anode alternating voltage is equal to the frequency of the impulses in accordance with the example. It could equally well be a multiple of the frequency of the impulses.

The fundamental feature of the invention is the combination of a long emission period of the charge of the impulse with a short absorption period of the same charge at the anode. According to a further feature of the invention in certain cases the emission period of the impulse charge should not be substantially smaller than the time between two impulses. In general use will be made of a periodic method and the fundamental or a harmonic of the impulse period will be caused to coincide with the period of the circuit oscillation.

When the basic idea is carried into practice, the electrons which have left the cathode at different times (within the emission period of one impulse charge) must reach the anode at the same time, which obviously can only be achieved if the time of travel of an electron between the cathode and the anode is smaller, the later it starts from the cathode. The time of travel can be influenced in various ways, either by variation of both the length of the path of the electrons and the acceleration or only by varying the length of path or only by varying the acceleration.

Where only the length of path is varied, for instance for operating a valve consisting of at least a cathode, two grids and an anode, means are provided to allow electrons from the cathode to enter more or less uninterruptedly a space (collecting space) between the cathode and the grids and to remain therein and be able to empty this space towards the anode in a time which is short compared with the time taken in filling it.

The grid which effects the filling of the space has a positive voltage which at least at the end of the filling period amounts to a multiple of the saturation voltage measured statically, and the second grid which causes the emptying of the space is positive for a short period only at the end of the filling period.

Where only the acceleration is varied, the electrons leaving the cathode are differently accelerated, by means of a field force (conducting force) which increases rapidly with the emission time, into a space (conducting space) bounded by two electrodes, for example the cathode and an auxiliary electrode, and in an adjoining space which is approximately free from field are accumulated to form a compact charge owing to the greater velocity of the later electrons, and so pass to the anode in a condensed state.

A modification of the second example given above is necessary when unavoidable disturbances, for example reciprocal forces of the electrons (space charge forces), velocity scattering of emission from the cathode or owing to angular deflection at the grids, prevent a simultaneous arrival of the electrons, because the disturbing influences are greater than the collecting influences of the acceleration field. The operation of collecting should then be repeated once (or more than once), in which case, on account of the growth of the field forces during the period, the effect of the field forces becomes constantly greater and the result of the disturbances remains small owing to the period of time which becomes constantly smaller until the uniting point is reached, so that the proportion of collecting to disturbances is more favourable.

Other features of the invention are:

(a) that the depth of one or more spaces where there is no field is greater than the depth of at least one of the conducting spaces;

(b) that additional means, for example voltages applied to grid-like electrodes, are used in order to influence the quantity of electrons starting from the emission cathode and flowing into the collecting or conducting space (preliminary control);

(c) that the preliminary control voltage controlling the quantity of electrons has a frequency which is substantially smaller than the frequency of repetition of the impulses for the purposes of modulating the generated oscillations;

(d) that the preliminary control voltage which influences the quantity of electrons has a frequency which is greater than the frequency of repetition of the impulses;

(e) that the frequency of the preliminary control voltage which influences the current intensity is equal to the frequency of repetition of the impulses and the phase, amplitude and the constant component of this preliminary control voltage are made such that the electron current leaving the emission cathode enters a conducting space only at definite parts of the impulse periods, preferably only during rising parts of the conducting force;

(f) that the steps under (c), (d) and (e) are combined selectively;

(g) that the course with respect to time of the positive filling voltage or accelerating conducting force is generated from a substantially sinusoidal voltage in a device with a characteristic similar to a hysteresis curve;

(h) that the voltage difference between two electrodes which bound a conducting space are functions of the form $Q+P \cos(\beta t+\psi)$, the rising branches of which approximate sufficiently closely to a constantly increasing function, for example $$\left(\frac{d_0}{d_0-t}\right)^2$$

during the time which the electrons pass within the space controlled by them.

These features are of importance because when the time which the electrons remain in the conducting spaces is small, the necessary field force needs to have the desirable constantly rising course only during a relatively short time. This restriction involves a considerable simplification with reference to the voltage means to be used.

As already mentioned, the electrode which is referred to as cathode need not be the emission cathode of the thermionic valve. The cathode may be any electrode from which, or through which, electrons enter into a collecting space such as the space between the cathode 2 and the grid 5 of Fig. 4 or the conducting space between the cathode 22 and the grid 23 of Fig. 5, with a small velocity. Thus the invention may provide that the electron stream starting from the emission cathode is already controlled as regards quantity on entering into one of these spaces.

In Figure 2, an electron tube 41 in which an electron current, emitted from the indirectly heated cathode 42 and preliminarily controlled by the grids 43 and 44, passes through the grid 45 into the following discharge space in order to be subjected to a compression process in the following space.

The heating wire 46, which is fed by the voltage source 47, heats the cathode 42 having an oxide covered surface. Electrons emitted from the cathode are controlled by the electrode 43. The electrode 43 is supplied with an alternating voltage from a source 48 having the impulse repetition frequency and also such a high negative preliminary voltage 50 that only during a certain period charges leave the cathode 42. These charges are then forced to the grid 45 through the grid 44 by a positive voltage source 51 and the grid 45 is maintained at the same or slightly higher potential than the original cathode. This grid 45 or the virtual cathode formed at this grid, may be regarded as the actual functional cathode of the discharge space formed by the grids 52 and 53 and the anode 54. The collecting voltage is applied to the grids 52 and 53 in the same manner as that of the grids 23 and 24 of Fig. 5. The oscillatory circuit 55 is connected with the anode 54. As compared with Fig. 5 the difference lies only in the fact that the cathode 45 of the conducting space between the grids 45 and 52 is not an emission source of constant productivity but an electron source the intensity of which has already been influenced by a previous operation. The preliminary control can be employed for modulating the operation. The preliminary control frequency may be higher than the impulse repetition frequency so that there is a division of the charge which, owing to the compression as regards time which takes place in the following conducting space as in Fig. 5 is converted into a division of higher frequency.

The current flowing from the emission cathode 42 through the functional cathode 45 into a conducting space may be controlled in such a manner that the current is interrupted during definite times with a period equal to the impulse frequency and only passes into the conducting space during certain parts of the impulse period. This is essential if the constantly growing acceleration voltage, preferably a voltage proportional to $$\left(\frac{\delta_0}{\delta_0-t}\right)^2$$

is approximated to by the rising branches of harmonic functions of the form $Q+P \cos(\beta t+\psi)$, the remaining parts of which cannot be employed for collecting the electrons, and if only during the rising part of the periodic function, current can flow into the conducting spaces. Of the four constants $Q$, $P$, $\beta$ and $\psi$, to an approximation of the third degree, three are fixed and one can be chosen freely. $\beta$ is, in general, made equal to the impulse frequency or an integral multiple thereof. The alternating current source 48 supplies sinusoidal voltage which is adjusted according to phase and amplitude so as to allow current to pass through the electrode 45 only when the approximation function $Q+P \cos(\beta t+\psi)$ coincides sufficiently with the ideal function $$\left(\frac{\delta_0}{\delta_0-t}\right)^2$$

Figure 3 shows in the lower part the position of the preliminary control voltage at the grid 43 and the voltage $Q+P \cos(\beta t+\psi)$ at the grid 52. The phase of both voltages is dependent upon the time of travel of the electrons between the cathode 42 and the electrode 45 which as shown in the middle part of Figure 3 is so chosen that there is equality of phase between the grid 43 and the grid 52. The electrons leaving the cathode 42 during the positive part of voltage at the grid 43 are in the conducting space between 45 and 52 during the time in which the harmonic function coincides sufficiently with the constantly increasing function. It is seen from Figure 3 and Figure 2 how the electrons run together in the space between the grids 52 and 53 where there is no field and how they travel together to the anode 54. In the upper part of Figure 3 the anode voltage is indicated, its frequency being, for example four times the impulse frequency. The individual features provided for the preliminary control may also be combined.

The invention further provides a method of obtaining accelerating forces which grow substantially constantly during the impulse period, in which case the type of curve must ensure a very brief drooping of the periodic function since the returning part leads to scattering at least insofar as there is no interruption of the current by preliminary control.

The type of control which is provided, for example by the method according to the invention, makes possible, in contradistinction to other control methods, the use of gas-filled valves even at the highest frequencies. The valve may contain rare gases, or saturated mercury vapour at a low pressure. On account of the great inertia of the electrons there is formed in the immediate vicinity of the cathode a positive ion cloud which can be regarded as constant with respect to all rapidly alternating phenomena. In spite of the field of a controlling alternating voltage being superposed upon this ion field, the interruption of the cathode current in the ordinary control methods for regulating the current intensity cannot be obtained because it is not possible to obtain a negative field strength at the cathode. The collecting, and therefore also the interrupting method according to the invention depending upon the control of the time of travel, presupposes only a field force which constantly increases during the period without it being necessary to maintain definite absolute valves.

It is not necessary that the primary electrons leaving the cathode should themselves perform the impulse in the main discharge space. It would rather be of advantage first to collect the quantities of primary electrons and allow them to impinge during a brief period upon a secondary electrode from which they release secondary electrons. The strongly compacted quantities of secondary electrons passing to the anode from the secondary electrode then form the actual discharge impulse. It may also be advantageous to amplify the intensity of the impulse by a multiplication of the quantities of electrons released each time in several stages.

The higher the frequency is, the more will the displacement current caused by the electron movement cause the conveyance of energy in the oscillatory circuit. A continuous anode is thus not necessary since it does not need to absorb the electrons, whereby only high anode losses occur. With very short waves (time of travel equal to or greater than a half period) it is sufficient to use simple grid-like perforated anodes, at low frequencies two grid anodes arranged one behind the other and kept preferably at the same alternating potential (cage anode) are necessary, the distance between the anodes being so adapted to the time during which the collected charge remains inside the anode that the charge also leaves the anode at a favourable phase of the alternating voltage. It is possible to provide behind the anodes a collecting electrode in order to intercept the charge and prevent its returning to the discharge space. This electrode should be given a charge which is positive with respect to the cathode corresponding to the output.

Briefly the essence of the invention and of all its parts resides in the recognition of the necessity and possibilities of compacting with respect to time the charge of an impulse which starts with a long emission period in order to obtain a powerful impulse with brief anode absorption period.

I claim:

1. An electron discharge device having a cathode for emitting electrons, a first control electrode, a second control electrode comprising spaced electrical conducting elements electrically connected to form a field free space between said elements and an anode all in the order named, means tending to cause electrons emitted by said cathode to flow toward said anode, means for applying a voltage to said first control electrode with respect to said cathode such that electrons will pass through said first control electrode discontinuously, and other means for applying to said second control electrode a variable voltage having a rising positive characteristic at the time when the electrons which have passed through the first control electrode come into the vicinity of and under the influence of the second control electrode for accelerating said electrons, said accelerated electrons becoming compressed within the field free space whereby current to said anode reaches said anode in a sharp pulse and a tuned circuit connected to said anode and tuned to a frequency harmonically related to the frequency of the pulses.

2. An electron discharge device having a cathode for supplying electrons, a first control grid and second control grid including a pair of spaced grid members electrically connected together for providing a field free space therebetween, and an anode for receiving electrons, all in the order named, means tending to cause said electrons from said cathode to flow towards said anode, means for applying a negative bias with respect to the cathode to said first control grid, means for applying a voltage to said first control grid for causing electrons to pass discontinuously through said first control grid, means for applying to said second control grid a variable voltage having a rising positive characteristic at the time when electrons which passed through the first control grid come into the vicinity of and under the influence of said second control grid for accelerating the electrons, said accelerated electrons passing through the field free space of said second control grid becoming compressed within said field free space whereby electrons arriving at said anode produce sharp current pulses and a tuned circuit connected to said anode and tuned to a frequency harmonically related to the frequency of said sharp pulses.

3. An electron discharge device having a cathode for emitting electrons, a first control grid and a second control grid comprising a pair of spaced grid members electrically connected together for providing a field free space therebetween, and an anode all in the order named, and shielding means between said first and second control grids, a circuit including means for biasing said first control grid negative with respect to the cathode and for applying to said first control grid an alternating voltage such that the electrons will flow from said cathode through said first control grid during only a portion of the positive half cycle of the applied voltage, and a second circuit for applying to said second control grid an alternating voltage increasing from a negative to a positive value at the time when electrons which have passed through said first control grid come into the vicinity of and under the control of said second grid for accelerating the electrons, the accelerated electrons being compressed within the field free space of said second control grid into groups whereby electrons reach said anode in sharp pulses, and a tuned circuit connected to the anode and tuned to a frequency harmonically related to the frequency of said pulses.

4. An electron discharge device having a cathode for emitting electrons, a first control grid, and a second control grid comprising a pair of spaced grid members electrically connected together for providing a field free space therebetween, and an anode, all in the order named, and a shielding means between the first and second control grids and means for maintaining said shielding means at substantially cathode potential, an accelerating electrode between said first control grid and said shielding means, a circuit including means for biasing said first control grid negatively with respect to the cathode and for applying to said first control grid a voltage for causing electrons to pass discontinuously through said first control grid to form successive groups of electrons, and a second circuit connected to said second control grid for applying to said second control grid a variable voltage having a rising positive characteristic at the time when electrons passing through the first control grid come into the vicinity of and under the influence of said second control grid for accelerating the groups of electrons, accelerated electrons passing through the field free space of said second control grid becoming compressed within said field free space whereby each group of electrons arriving at said anode produces a sharp current pulse and a tuned circuit connected to said anode and tuned to a frequency harmonically related to the frequency of the sharp pulses.

5. An electron discharge device having a cathode for emitting electrons, a first control grid, and a second control grid comprising a pair of spaced grid members electrically connected together for providing a field free space therebetween, and an anode, all in the order named, and a shielding means between the first and second control grids and means for maintaining said shielding means at substantially cathode potential, an accelerating electrode between said first control grid and said shielding means, means for biasing said first control grid negatively with respect to the cathode, a circuit for applying to said first control grid an alternating voltage for causing electrons to pass discontinuously through said first control grid to form successive groups of electrons, and a second circuit connected to said second control grid for applying to said second control grid a variable voltage having a rising positive characteristic at the time when electrons passing through the first control grid come into the vicinity of and under the influence of said second control grid for accelerating the groups of electrons, accelerated electrons passing through the field free space of said second control grid becoming compressed within said field free space whereby each group of electrons arriving at said anode produces sharp current pulse and a tuned circuit connected to said anode and tuned to a frequency harmonically related to the frequency of the sharp pulses.

6. The method of operating an electron discharge device which comprises generating a flow of electrons, subjecting the flow of electrons to an electric field such that electrons will flow through said field discontinuously to form groups of electrons, subjecting said groups of electrons to a variable electric field having an increasing positive voltage characteristic for increasingly accelerating electrons in each group, whereby electrons are made to travel at different velocities, passing said accelerated electrons through a field free space to accentuate the grouping of the fast and slow electrons to form compressed groups of electrons for providing sharp current pulses and causing high frequency oscillations by use of said pulses.

7. The method of operating an electron discharge device which comprises generating a flow of electrons, subjecting the flow of electrons to an alternating electric field to permit the passage of a small group of electrons through said field during each cycle, subjecting each group of electrons for a short period of time to a variable electric field increasing in intensity in a positive direction to variably accelerate the electrons within the group, passing the accelerated group of electrons through a field free space for causing the fast and slow electrons to combine into a compressed group of electrons to provide a sharp pulse, and using the pulses for causing high frequency oscillations.

8. The method of operating an electron discharge device which comprises continuously generating a flow of electrons, subjecting the flow of electrons to an alternating electric field whereby electrons are permitted to pass through said field during only a part of each cycle of said alternating field to form successive groups of electrons, subjecting the groups of electrons to a second alternating electric field during that period when said field is increasing in intensity in a positive direction to variably accelerate the electrons in said groups of electrons, passing the accelerated electrons through a field free space to cause the fast electrons to overtake the slow electrons to form compressed groups of electrons for providing sharp current pulses and utilizing said pulses for causing high frequency oscillations.

9. The method of operating an electron discharge device which comprises generating a flow of electrons, subjecting said flow of electrons to an alternating electric field to permit passage of groups of electrons discontinuously through said field, accelerating said electrons, subjecting said electrons to a second alternating electric field having an increasing positive voltage characteristic so that the electrons will be variably accelerated to have different velocities, passing said accelerated electrons through a field free space whereby the fast electrons overtake the slow electrons to form compressed groups of electrons for providing sharp current pulses, and utilizing said pulses to cause high frequency oscillations.

GÜNTHER JOBST.